(12) United States Patent
Tirabassi et al.

(10) Patent No.: US 6,400,925 B1
(45) Date of Patent: Jun. 4, 2002

(54) PACKET SWITCH CONTROL WITH LAYERED SOFTWARE

(75) Inventors: Maria A. Tirabassi; Edward A. Arenberg, both of Redondo Beach, CA (US)

(73) Assignee: TRW Inc., Redondo Beach, CA (US)

( * ) Notice: Subject to any disclaimer, the term of this patent is extended or adjusted under 35 U.S.C. 154(b) by 0 days.

(21) Appl. No.: 09/258,167

(22) Filed: Feb. 25, 1999

(51) Int. Cl.[7] ................................. H04B 7/19
(52) U.S. Cl. ...................... 455/12.1; 455/13.1; 455/428
(58) Field of Search ............................. 455/12.1, 13.1, 455/427, 428, 429, 430

(56) References Cited

U.S. PATENT DOCUMENTS

| | | | | |
|---|---|---|---|---|
| 4,931,802 A | * | 6/1990 | Assal et al. | 342/356 |
| 5,041,833 A | * | 8/1991 | Weinberg | 342/357 |
| 5,261,118 A | * | 11/1993 | Vanderspool, II et al. | 455/51.2 |
| 5,527,001 A | * | 6/1996 | Stuart | 244/158 R |
| 5,736,959 A | * | 4/1998 | Patterson et al. | 342/354 |
| 5,796,715 A | * | 8/1998 | Patterson et al. | 370/60 |

* cited by examiner

Primary Examiner—Thanh Cong Le
Assistant Examiner—Thuan T. Nguyen
(74) Attorney, Agent, or Firm—Antonelli, Terry, Stout & Kraus, LLP

(57) ABSTRACT

A communications satellite (201) has an on-board high speed packet switch for switching transmitted data packets. The packet switch (502) is part of a processor subsystem (501) which also includes a number of demodulators ($503_1$ to $503_n$) demodulating signals received from an uplink downconverter. All of the processors in the processor subsystem (501) are organized into a loosely coupled, distributed, architecture of general purpose computer modules (601) and digital signal processor modules (602) having both primary and redundant processors and being connected to each other by dual redundant PCI buses. Software and firmware is layered and distributed redundantly over the processor modules (601, 602).

16 Claims, 8 Drawing Sheets

PACKET SWITCH CONTROL WITH LAYERED SOFTWARE

CROSS REFERENCE TO RELATED APPLICATION

Reference is made to related application entitled "Redundant Packet Switch Controller", filed on even date herewith Ser. No. 09/257,359, which application is incorporated herein by reference.

BACKGROUND OF THE INVENTION

1. Field of the Invention

This invention relates generally to data communications systems and methods. In particular, the present invention relates to a packet data switch controller suitable for implementation in a communications satellite.

2. Description of Related Art

Switched packet data communications systems and methods are well known in the art. Perhaps the most prevalent examples of switched packet data communications systems are those utilizing the Asynchronous Transfer Mode (ATM) network protocol developed to efficiently move information at a faster rate. The networks of switched packet data communications systems include a number of packet switches of otherwise minimum functionality which move user information encapsulated into packets (sometimes referred to as cells) from an input port to an output port. In addition to the user (or payload) data, these packets have a header containing information to be used inside the network for routing, error correction, flow control, etc. For example, the packets in an ATM network are defined as having 53 bytes composed of a 5 byte header and 48 byte payload information.

The general architecture of a conventional packet switch 100 in such a network is shown in FIG. 1. It consists of a number of input interface modules $101_1$ to $101_n$, a switching module 102, a number of output interface modules $103_1$ to $103_n$, and a switch manager 104. Each input interface module $101_1$ to $101_n$ includes a physical interface to an optic fiber or a cable, such as a coaxial cable commonly used in CATV systems, of the network. Each input interface module $101_1$ to $101_n$ performs validation and translation of virtual channel identifier (VCI) and virtual path identifier (VPI), a header error control (HEC) check, statistics collection, conforming traffic validation, and general traffic shaping and policing. Switching module 102 routes the packets from each input interface module $101_1$ to $101_n$ to the correct output port, replicates multicast packets, discards packets depending on traffic congestion, and performs priority queuing of packets. Each input interface module $103_1$ to $103_n$ also includes a physical interface to an optic fiber or a cable, such as a coaxial cable commonly used in CATV systems, of the network and also performs statistics collection. Switch manager 104 performs network management and connection management.

Although not shown in FIG. 1, conventional packet switch 100 may utilize a number of general purpose processors. These processors are usually tightly coupled in a specific configuration, with a connection path between the general purpose processors fixed by hardware, and having one operating system performing unified management for the configuration of processors. However, the general purpose processors may be loosely coupled to one another and operated by a distributed real-time operating system in conjunction with embedded firmware. In such a loosely coupled system, if one processor fails, the system must be rebooted in order to have the failed processor replaced with another processor. The necessity of rebooting the system in order to implement fault correction is a major disadvantage in a communications satellite responsible for providing switching for a large amount of data packets.

Packet switch 100 is usually provided as a discrete element in a terrestial based network. As such, there is usually easy access to the packet switch in the event of a fault or malfunction, and in order to perform maintenance, diagnostic tests, or software update installations. Packet switch 100 is thus generally unacceptable for installation in extremely remote locations and the network thus has geographical limitations, such as those imposed by large bodies of water and by space.

Remote locations also present other obstacles. For example, in a space-based communications satellite, it is customary to provide a control processor to manage the overall operation of the processing suite and to provide a central point of interaction for reception of, reaction to, and implementation of control directives from the ground, collection and gathering of statistics, formatting and sending of reports on processing activity, etc. Since packet switch 100 is a discrete element in a terrestial communications system, it is usually designed independently without taking into consideration the other elements of the network in which it is installed and is unsuitable for use in a communications satellite. For example, during a long period of operation in orbit, several processors and other elements of a communications satellite may fail. Although embedded firmware in conjunction with real-time distributed operating system provides a limited amount of software adaptability in those systems with loosely coupled processors as described above, there is a need for a multiprocessor operating and application software structure for a packet switch in a communications satellite that efficiently meets the operational performance requirements of the and provides a framework for more operational robustness, fault tolerance and reliability.

BRIEF SUMMARY OF THE PREFERRED EMBODIMENTS

It is an object of the following preferred embodiments of the invention to provide a global packet data communications system. In particular, the preferred embodiments preferably include packet switches installed on board satellites located in a geosynchronous, medium earth, or low earth orbit in space. The satellites of these embodiments are preferably capable of operating in different communications applications.

As part of the preferred embodiments, it is a particular object to provide a fast cell/packet switch having a general software architecture particularly well suited for the above objects. The software architecture of the fast cell/packet switch is preferably flexible so as to be able to satisfy the communications desires of different users. In particular, the switch must be able to operate at speeds higher than conventional packet switches and must be able to implement fault correction without the need for rebooting.

A real-time control processor is used in the communications satellite of the preferred embodiments. In addition to managing the overall operation of the processing subsystem, it also provides a packet switch controller performing switch configuration and management, and dissemination functions. This real-time control processor, including the packet switch controller, must efficiently achieve the throughput required of the switch control function.

Throughput efficiency is achieved through optimization of the distribution of layered software control functions and application software to each one of multiple general processors (GPs) and digital signal processors (DSPs). In particular, there is layering of: (a) firmware optimized for specific hardware control or I/O data movement functions; (b) a real-time operating system for general purpose processing; (c) software executives optimized for DSP and embedded I/O control functions; and (d) application software distributed and optimized to each DSP and GP. This feature allows the combination of GPs and DSPs for efficient distribution of software control functions. In the event of a failure of any one processor, tasks can be redistributed or a switch can be made to a different processor.

A preferred application of the present invention is in a wideband satellite communications system transmitting payload data over a number of different frequency channels at extremely high data rates. The communications satellite of such a system has significant processing requirements, such as demodulation and channelization of the wideband signal into narrowband channels, in addition to the packet switch controller. The system may be a "secure" frequency-hopped communications system in which reception of the transmitted waveform by the communications satellite requires dehopping and/or frequency hopping of the data transmitted by the communications satellite.

In addition to the foregoing summary, a better understanding of the preferred embodiments will become apparent from the following detailed description of the preferred embodiments when read in connection with the accompanying drawings. While the foregoing and following written and illustrated disclosure focuses on disclosing preferred embodiments of the invention, it should be clearly understood that the same is by way of illustration and example only and is not to be taken by way of limitation. In particular, several elements and features of the preferred embodiments are not essential for implementation of the invention. The spirit and scope of the present invention is limited only by the terms of the claims in the patent issuing from this application and not by the preferred embodiments.

DETAILED DESCRIPTION OF THE PREFERRED EMBODIMENTS

Before describing in detail the preferred embodiments of a redundant packet switch controller in accordance with the present invention, it should be observed that the invention involves a novel combination of components, controls, functions and operations as well as structure. Accordingly, the block diagram illustrations of the figures representing the preferred embodiments may represent an exemplary structural arrangement of the invention or may merely convey the functional and operational aspects of the invention in a manner which makes them apparent to those skilled in the art.

Figure 1:
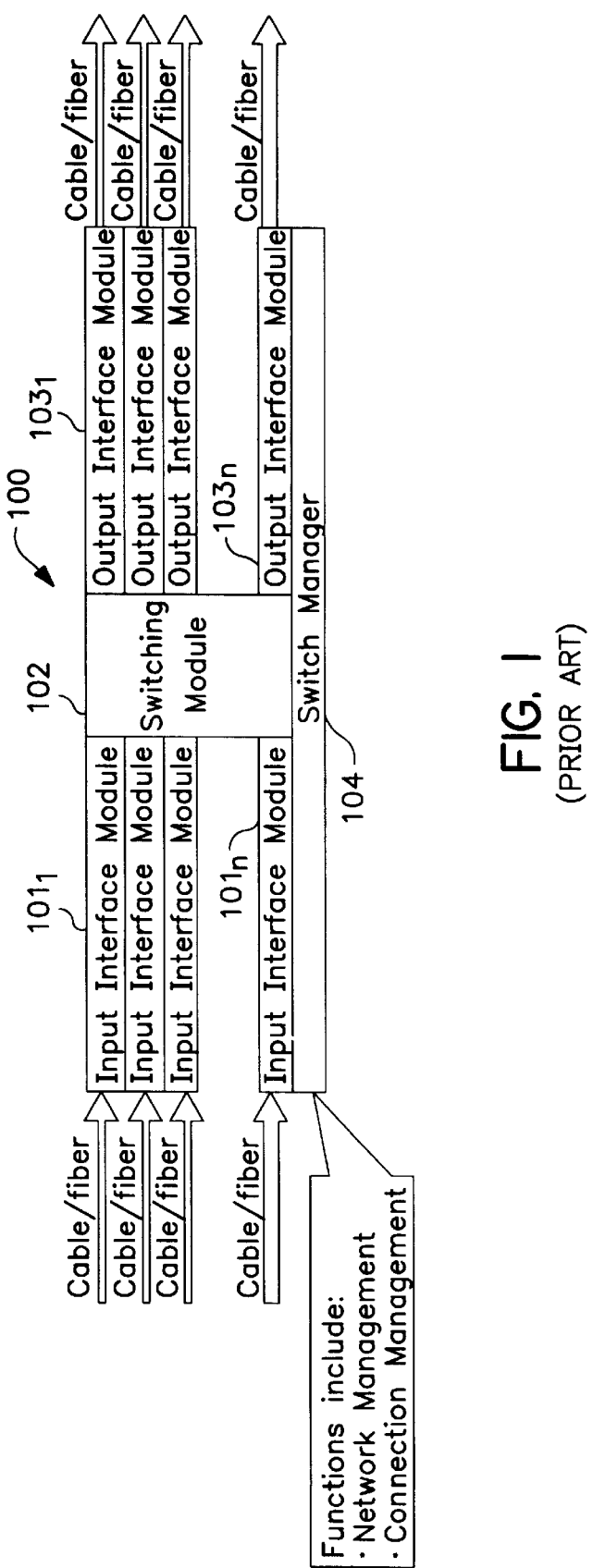
FIG. 1 is a block diagram of a packet switch used in prior art terrestial based switched packet data communications systems.
Figure 2:
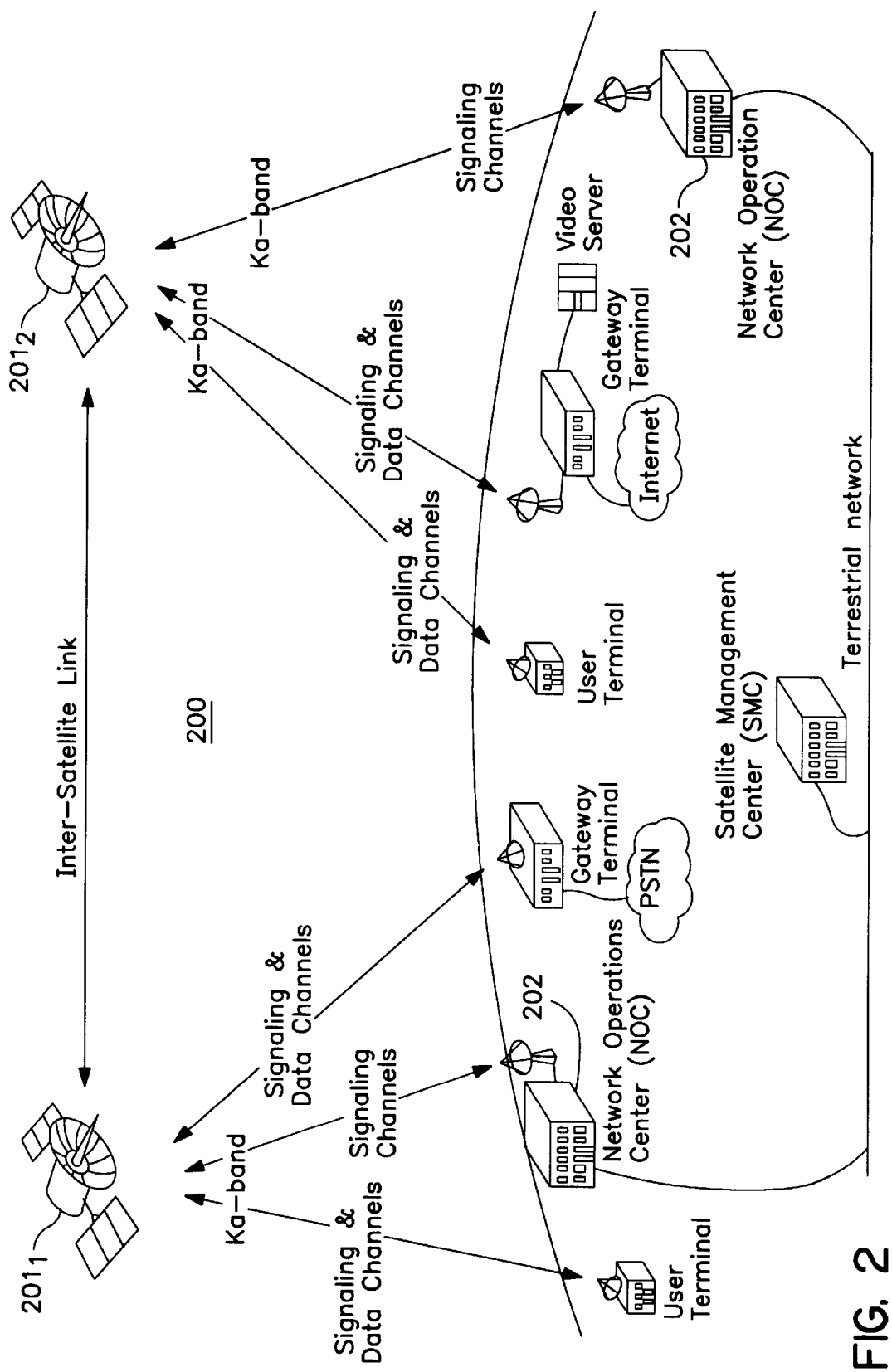
FIG. 2 is an overview of an exemplary satellite communications system in which the preferred embodiments of the invention may be implemented.

FIG. 2 is an overview of an exemplary satellite communications system 200 in which the preferred embodiments of the invention may be implemented. The system includes a plurality of communications satellites in geosynchronous orbit, of which communications satellites $201_1$ and $201_2$ are shown. While the preferred embodiment is for use with a geosyncronous satellite, the invention is also useful with satellites in low earth orbit (LEO) and medium earth orbit (MEO). The communications satellites are linked to each other and have bidirectional Ka wideband links, containing a number of relatively narrowband signalling channels, with respective network operation centers (NOCs) 202. The NOCs 202 are in turn connected, perhaps by a wired connection of a suitable type, to a terrestial network having a satellite management center (SMC) managing the satellite communications system.

Each communications satellite 201 has a Ka wideband transmission link, with a number of relatively narrowband data and signalling channels, for transmitting to and from each one of a number of user end terminals (UETs). These terminals may be for a single user or they may be a gateway for information to or from a number of users such as with the public switched telephone network (PSTN), the internet or a video server.

Figure 3:
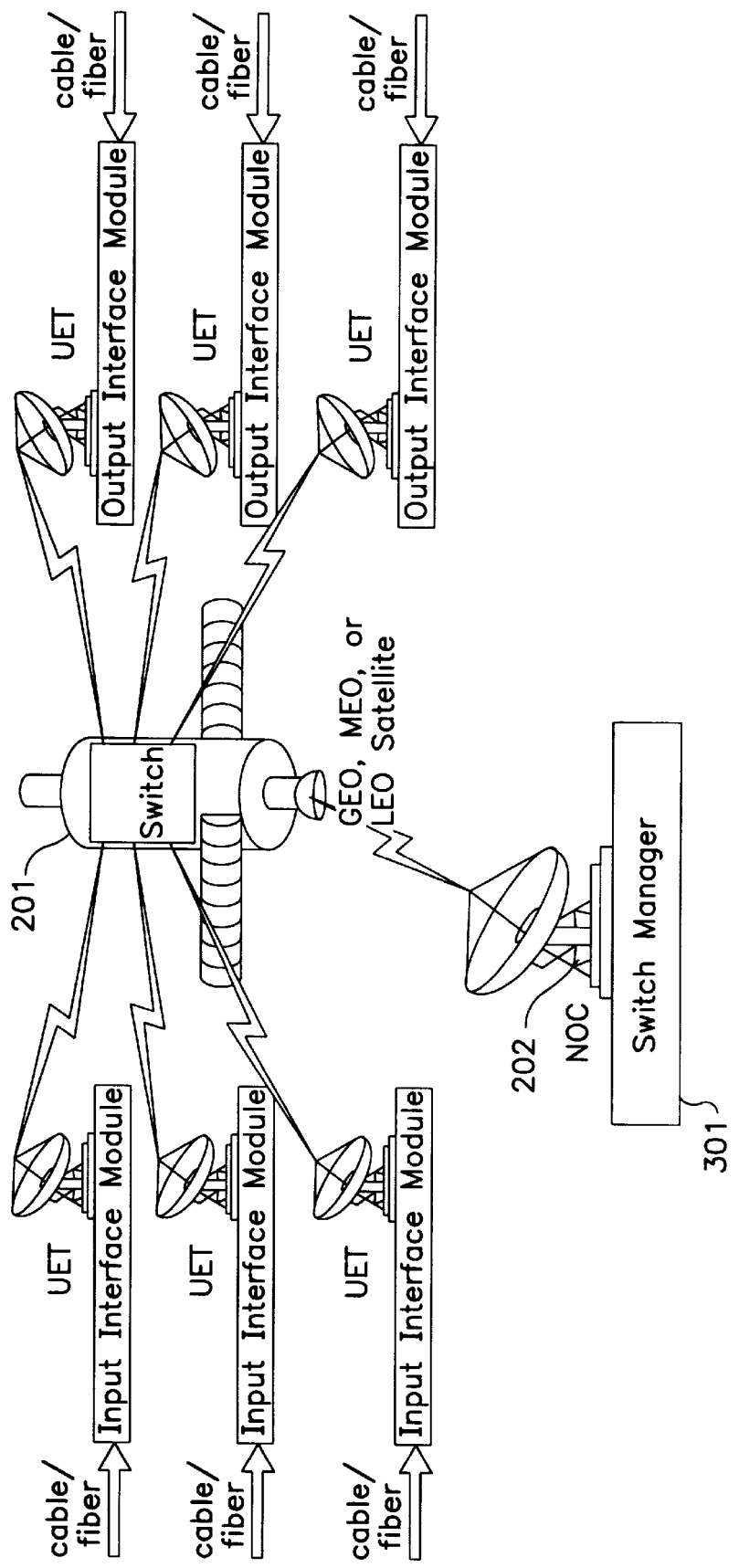
FIG. 3 is a generalized diagram illustrating the switching subsystem in the exemplary satellite communications system of FIG. 2.

The switching subsystem of a communications satellite 201 in satellite communications system 200 is isolated and shown in FIG. 3. NOC 202 may communicate with communications satellite 201 to manage the switch through a separate interface to the communications satellite than the UETs, preferably through a different antenna and in a secure mode such as a frequency hopping scheme. NOC 202 implements a switch manager 301 for providing some switch configuration and management directives, which may be physically located in NOC 202 or in the SMC, or distributed in some manner therebetween. It should be noted that switch manager 301 in satellite communications system 200 is different than switch manager 104 in conventional packet switch 100.

Figure 4:
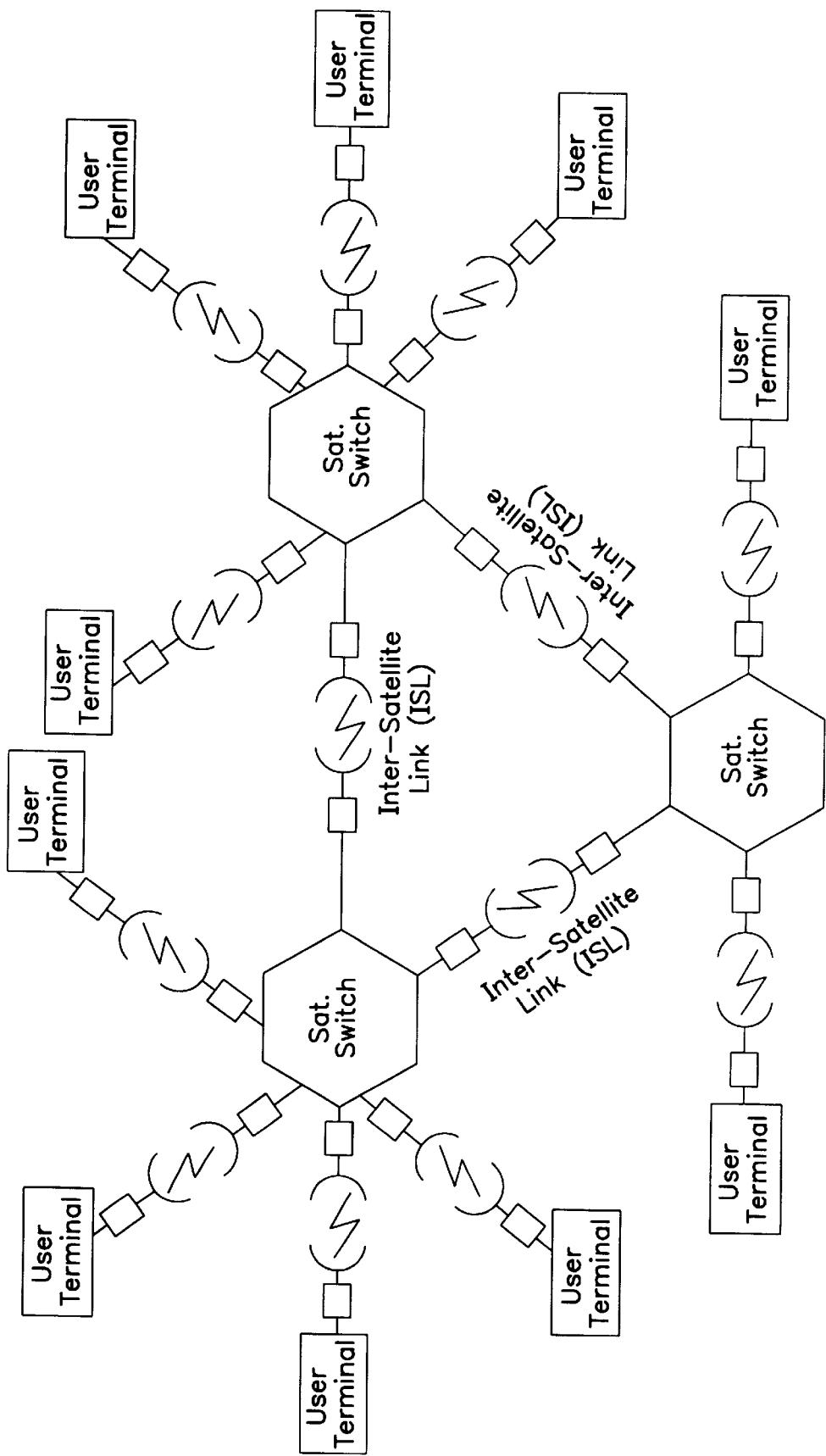
FIG. 4 is a schematic mapping of the communication links in the exemplary satellite communications system of FIG. 2.

FIG. 4 is a schematic mapping of the satellite switches and communication links in the exemplary satellite communications system of FIG. 2. It helps illustrate that, when viewed in the aggregate, satellite communications system 200 provides a complete network enabling switched packet data communication between a large number of user terminals.

While communications satellite 201 contains a significant number of elements, only the switch is shown in FIG. 3 merely to emphasize the present invention. Certain functions must be performed to receive, switch and transmit data packets in communications satellite 201 which are, separation of the various uplink channels by frequency, the recovery of estimates of the modulated data packets from the burst body and the passing of the estimates to error control processing, and the performing of decoding.

The communications satellite 201 has three major functional sub-systems. The Ka wideband data transmitted on a satellite uplink is typically frequency division multiplexed (FDM) and further divided by time division multiplexing (TDM) into slots occupied by a transmission burst. These bursts utilize phase shift keying (usually either BPSK or QPSK) as the modulation method. The transmission bursts have a header that facilitates forming an initial estimate of the carrier phase and a body which carries information typically decoded by means of an error control code. The first functional subsystem has a tuner and channelizers to divide the data of the transmission bursts into sub-bands which are typically 17 MHz, and a demodulator and decoder to perform demodulation and decoding of the data in each sub-band outputted by the channelizers using the initial estimate of the carrier phase formed from the transmission bursts. The data packets may be in the form of ATM cells which are well known in the art. When encoding utilizes ATM cells, it is necessary to recover the cells from the decoded data and to perform integrity checks upon them. This processing may include decoding a Reed-Solomon outer code.

The data transmissions may be configured into any one of three modes. The details of these modes, and of the correspondingly preferred demodulator and decoder, are explained in further detail in the co-pending applications entitled "Buffering and Sequencing of Soft Decisions of Multiple Channels Into a Single Shared Biorthogonal Decoder", filed on Jan. 19, 1999 Ser. No. 09/239,871 "Serial to Parallel Conversion of Data to Facilitate Sharing a Single Buffer Among Multiple Channels", filed on Jan. 19, 1999 Ser. No. 09/239,872; and "Buffering and Sequencing of Data From Multiple Channels Through a Shared Decoder", filed on Jan. 19, 1999 Ser. No. 09/240,171, which applications are incorporated herein by reference in their entirety.

The second functional sub-system performs cell level functions on the data received from the demodulator and decoder in the first sub-system and performs appropriate switching of the data packets. The second sub-system includes the switch shown in FIG. 3. It is the primary focus of this application and will be described in more detail below. The third major functional sub-system has downlink modulators for receiving the data packets from the switch and transmitting them to the user end terminals. It is preferably able to accommodate a number of different transmission modes, including a downlink hopping beam scheme.

Figure 5:
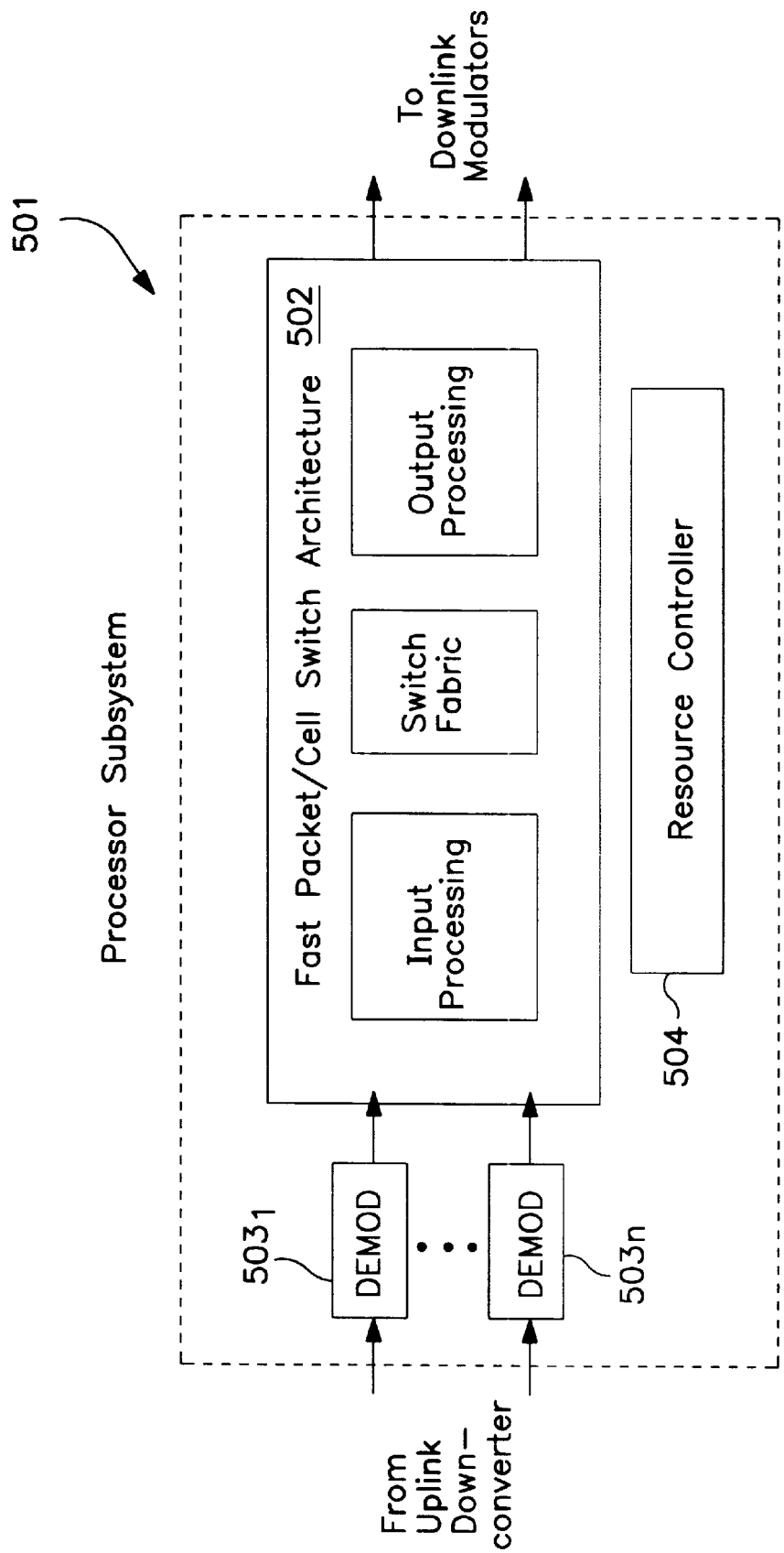
FIG. 5 is a general block diagram of a preferred embodiment of a processor subsystem in relation to the switch and other functional subsystems of the communications satellite of FIG. 3.

While there are three major functional sub-systems in communications satellite 201, these functional sub-systems may not be distinct in their physical implementation. For example, the demodulator and decoder of the first functional up-link sub-system may utilize control signals, timing signals, and code signals from, and be under the general control of, an onboard satellite processor. FIG. 5 is a general block diagram of the physical implementation of a processor subsystem 501 in a preferred embodiment of communications satellite 201. Processor subsystem 501 includes a resource controller 504 which controls demodulator and decoders $503_1$ to $503_n$ as well as fast packet/cell switch 502. As explained above, the demodulator and decoders $503_1$ to $503_n$ receive the signals from the downconverter of, and are themselves part of, the first functional up-link subsystem. Nevertheless, due in part to the amount of data processing performed therein, they are controlled by resource controller 504 together with fast packet/cell switch 502 in processor subsystem 501. The data output from processor subsystem 501 is provided to the modulators of the third downlink functional subsystem.

Figure 6:
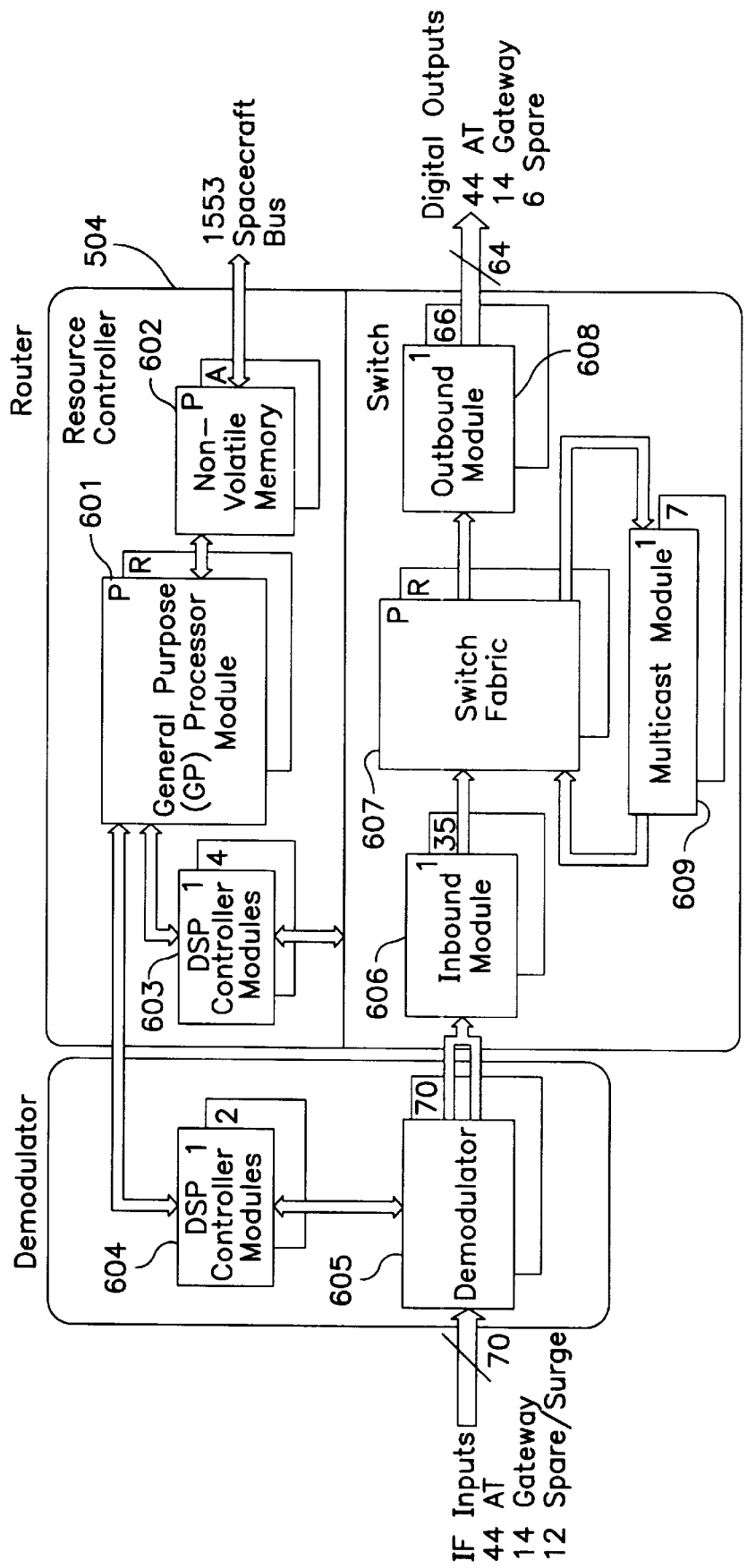
FIG. 6 is a more specific block diagram of a preferred embodiment of the processor subsystem in the communications satellite of FIG. 3.

FIG. 6 is a more detailed block diagram of processor subsystem 501. Resource controller 504 has primary and redundant general purpose (GP) computer modules 601, primary and redundant non-volatile (NV) system memories 602, and a number of digital signal processor (DSP) controller modules 603. The non-volatile memories 602 have a 1553 interface to the remainder of communications satellite 201 and an autonomous software upload capability. The signals from NOC 202 may be forwarded to GP computer modules 601 through this 1553 interface, or through the ATM data paths through a secure uplink channel.

There are two types of redundant memories. Each GP computer module 601 has its own memory space associated with it. If a processor is redundant, then the memory that's associated with it is also redundant. The non-volatile memory 602 used for storing the static images and configuration information has its own redundant set of memories. It is connected to the spacecraft bus to connect to the telemetry, health and status information, software images, etc., uploaded and sent to the processor subsystem. A smart I/O processor contained in the resource controller handles transfer of data in and out of the memory, and locking of memory segments, a region that the type of operation needs to be performed with any communication data that should be run into the specific processor. If it's actually a new image that's being uploaded, then it needs to know that it's in a volatile memory and then signal the processor that the new memory image has been loaded.

Each GP computer module 601 preferably includes a 32-bit computer capable of performing 40 to 100 million instructions per second (MIPS). Depending on the processing and throughput requirements of the fast packet/cell switch 502, any suitable general purpose processor, such as a Power PC or RH32, may be used. A maintenance processor, which can be a relatively less powerful 16-bit processor, is also included in each general purpose computer module 601.

The GP computer modules 601 are connected to demodulator DSP controller modules 604 of demodulators $503_1$ to $503_n$ through a serial interface such as 1773A. Each demodulator controller module 604 is preferably implemented using 21020 digital signal processors by TEMIC. A dual redundant PBI interface connects demodulator controller modules 604 to demodulator boards 605. The number of demodulator boards 605 is preferably equal to the number of IF inputs received by demodulators $503_1$ to $503_n$.

The GP computer modules 601 are connected to DSP controller modules 603 through a dual redundant PCI interface. Each DSP controller module 603 is connected to a number of modules in switch 502 through a dual redundant PCI bus discussed in more detail below with respect to FIG. 7.

In switch 502 of processor subsystem 501, inbound modules 606 receive the outputs of demodulators $503_1$ to $503_n$. The output of inbound modules 606 is provided to primary and redundant switch fabrics 607. Outbound modules 608 receive an output of switch fabrics 607 and provide digital outputs to be sent by the downlink subsystem. Multicast modules 609 receive an output of switch fabrics 607 and provide an input to switch fabrics 607 in order to carry out multicasting by port duplication.

One important feature of the processor subsystem in the preferred embodiments is the redundancy that is built into many of the modules and further provided in the form of dual redundant buses. The various modules of processor subsystem 501 described above can be interconnected over duplicates of the same bus. If one of the buses, or one of the components that connects to a bus fails, a switch can be made over to the redundant bus or redundant component. The buses are truly physically redundant so that, in the back plane of the module according to the preferred embodiments, there are two separate sets of physical trace lines and separate pin outs for each bus.

For example, in GP computer modules 601, an I/O interface is modified to provide cross copying where the single input and output from the GP processor chipset can be provided to either one of two redundant PCI buses. Both of the processor on the primary GP computer module 601 or the processor on the redundant GP computer module 601 can use either bus. If the GP computer module fails to switch the redundant processor to PCI bus A or if bus A itself fails, then the redundant processor can be connected to PCI bus B.

The proper selection of PCI bus A or PCI bus B depends on the failure mode of the processor subsystem 501 at the time. The failure mode is tracked by registers at multiple places in processor subsystem 501. For example, if a bus is always timing out and not getting its I/O communication handled properly, it can inform the software that's running on those processors connected to and using the bus. Depending on the type and location of the failure, processor subsystem 501 will go to a higher level of decision making to select the failure mode. The failure can go all the way to ground if, for example, an entire GP computer module 601 or DSP controller module 603 is inoperable, in which case the module will simply be powered off and routing of data to and from the inoperable module converted so that it does not utilize that module. The software is able to detect the failure modes sequentially in descending order to determine the lowest replaceable unit such as a specific general processor, digital signal processor, or bus.

These failure modes utilize a number of registers in the 16-bit maintenance processor of the GP computer module 601. The maintenance processor continuously updates its registers so the software knows whether or not there is any fault. There are also fault registers for each one of the PCI buses which log whether or not there have been any failures on the bus. A fault management tab will periodically look at the status of these registers and record any failure information.

A higher level of decision making process can occur in multiple levels of the design. When a failure is detected in a processor, an attempt is made to reach the failure or fix it in software. If the failure keeps occurring in a processor, the decision making process to switch out the processor is done elsewhere. If a certain amount of information logged, it can be sent to NOC 202 and to other units of the communications satellite 201 so that a suitable determination can be made in light of the network management. While this process doesn't have to be performed in any particular manner, a key feature of the preferred embodiments is that it isn't made autonomously.

Figure 7:
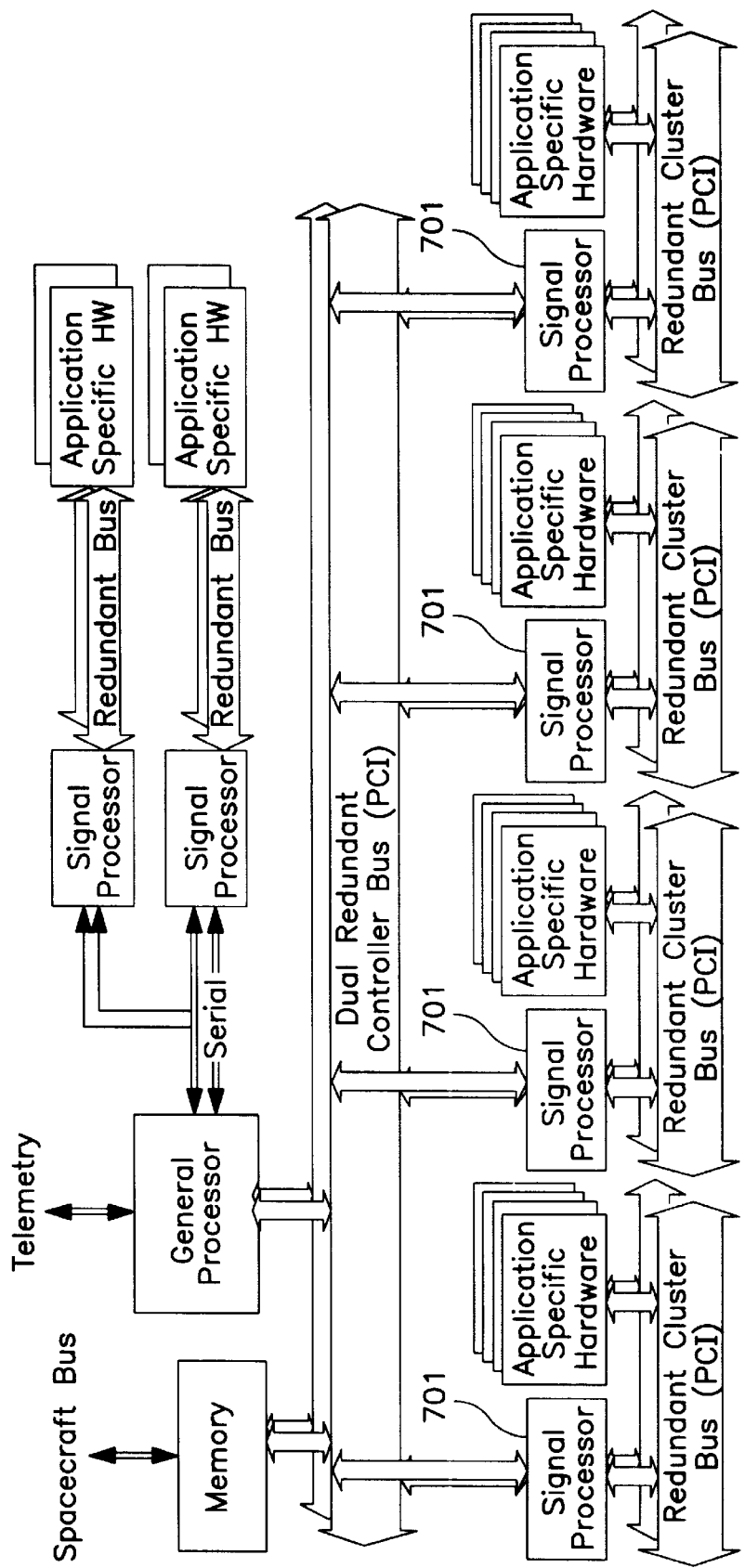
FIG. 7 is a diagram illustrating the loosely coupled, distributed, architecture of multiple processors and dual redundant buses in a preferred embodiment of the processor subsystem in the communications satellite of FIG. 3.

FIG. 7 more clearly shows a preferred organization of general processors (GP), digital signal processors (DSP), and application specific hardware (ASH) in a loosely coupled distributed processing architecture using dual redundant industry standard PCI buses. At the top of the hierarchy is the GP computer module that performs unstructured high level control and coordination functions among DSPs and interacts with the spacecraft control processor. Depending on physical proximity, the GP set communicates with remote DSPs via dual-redundant 1773 standard serial buses and physically colocated DSPs via dual-redundant parallel PCI buses. In turn, the DSPs connect with ASH using dual redundant PCI buses as well.

Although not shown, the ASH elements are themselves interconnected in their own specialized internal scheme to provide functionality and redundancy spares management. All of the processors execute their specialized tasks while interacting with each other as enabled by a loosely coupled multi-processing structure. Some of the processors are powered on and ready to assume processing responsibilities on short order. Other processors are turned off to save power, but are ready to be configured as may be required to replace a failed processor.

The preferred embodiment using this architecture provides the communications satellite 201 with the advantageous ability to resist faults, reconfigure to correct or compensate for the faults and resume normal operation following the failure of any processor. The application processor code is built on top of a layered distributed operating system such that the function can be run on any processor connected to the ASH. Upon detection of a failure, the failed processor's task assignment and related database is transferred to a new processor connected by dual-redundant buses whereupon it continues the failed processor's task. Dual redundant busing increases the reliability of the system by ensuring that a path will exist among the processors and the ASH.

Although not shown, each dual DSP signal processor 701 is actually dual redundant. There are two buses as well as two signal processors. Depending on the location of the failure, for example if the failure is in primary DSP processor 701, it can be switched to the redundant signal processor. If both signal processors fail, the system can be operated by another one of the dual DSP signal processors 701 which can take over the task. The elements are grouped together in a number of clusters, each of the clusters having respective redundant cluster buses. If one of the clusters, signal processors, or both, fail, there's no more redundancy within that cluster. In such a case, one of the signal processors from another cluster can take over the task of the failed signal processor. The plurality of clusters allow switchover between different processors without affecting the main dual redundant bus in resource controller 504.

In normal operation, there's always only a limited amount of resources on communications satellite 201 to process a payload. The system software that's loaded onto it will be configured to operate in the hardware configuration that's running at the time. If there is a catastrophic failure where two DSP processors and/or a cluster are lost so that you have to reassign the task, a new code image is uploaded to the processor subsystem 501 by NOC 202 to provide an instruction to use a particular DSP processor. The resource controller 504 performs a reassignment of resources in order to control a further range of hardware. However, such a reassignment of hardware, whether permanent or temporary, is low in the order of failure modes. Most failures are a temporary inability by a component or bus to respond caused by an overload of data.

The specifications for the PCI Local Bus, Revision 2.1, has a number of configurable items. The preferred embodiment defines some of those configurable items for fault status. Additional status registers are included for each one of the dual redundant PCI buses that will log certain information transferred on the bus. These extensions include, for example, parity for the PCI bus and additional hand out information for indicating whether or not there is confirmation of receipt of data. Inside each of the GP and DSP signal processors, memory and the switch modules connected to a PCI bus is an integrated chip that can become a master in the system so there's a controllable connection to the PCI bus within each of those blocks. There's at least one state in each of those blocks in which that particular block is connected to the PCI bus and can be a master of the bus. Consequently, while there are multiple possible masters and slaves, there is in any instance one chip responsible for arbitrating the information to and from each of the processors that transfer data to each other over the bus.

Elements of a distributed loosely coupled multiprocessing real-time operating system, executive, or kernel are hosted on each processor 701 to support execution of application software that's redundant of the software and/or firmware on the other signal processors 701. This operating environment enables the seamless communication among processors as if they were operating out of the same memory and I/O space. Even if one of the processors or clusters is totally lost, the ground would have to reconsider the system and upload information into one of GP computer modules 601, which would then allow those tasks to run on one of the remaining processors in the cluster or one of the remaining three clusters.

Figure 8:
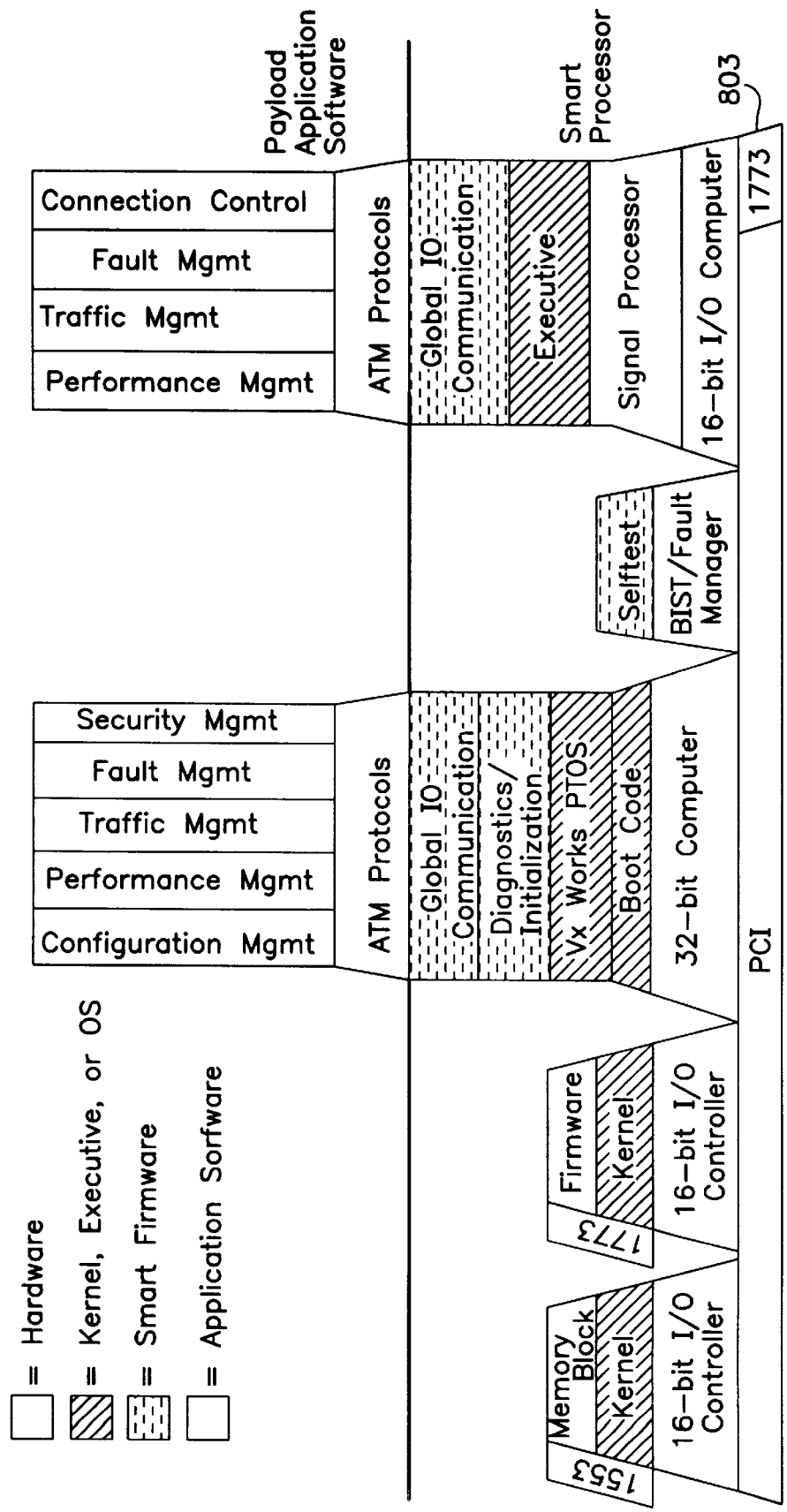
FIG. 8 is an illustration of the layered software distributed on the processors in the preferred embodiment shown in FIG. 7.

FIG. 8 is an illustration of the layered software and firmware distributed on the processors in the preferred embodiment shown in FIG. 7. At the bottom physical layer, a PCI backplane 800 provides a high-rate communication channel. The GP computer 601 is connected to PCI backplane 800 as are the various DSPs. Although there are numerous DSPs in the preferred redundant architecture, only two types of the connections between the DSPs are included in FIG. 8, 800 and 803. There is also a built-in self test (BIST) and fault manager 802 implemented. The autonomous bootup and initialization is managed by 32-bit GP computer 601. The first 16-bit I/O controller 801$_1$ has a relatively low-rate 1553 interface to, for example, non-volatile memory 602. The second 16-bit I/O controller 801$_2$ has a relatively low-rate 1773 interface to, for example, the demodulators.

Running on top of the hardware elements are the real-time operating system (RTOS) on the GP computer modules 601, an executive on the DSPs 801$_3$, and a small kernel on the 16-bit I/O controllers. A global communication software layer turns local I/O and memory space into one unified construct readily accessible to all processors. It also incorporates required interprocess communication and synchronization enabling processes running on multiple processors to appear to be running on a single processor. This architecture in turn enables application software to be written as if running on a uni-processor while in reality being hosted on heterogeneous multi-processors. The benefit of this approach is that performance optimization is guaranteed by the operating environment and the applications software focuses primarily on functionality and only secondarily on performance.

Task partitioning is performed at initialization, while repartitioning occurs when a processor is taken off line and a spare processor takes over its tasks. The assignment of tasks is carried out by the loosely configured, distributed architecture and layered software. It's not done autonomously in any one specific processor. Therefore, in addition to optimizing performance, this layered approach also supports fault tolerance and eases the pain of reconfiguration when a failed processor needs to be replaced in flight.

A specific path to each DSP is independent from the other ones that makes it a more distributed system as opposed to both of them working on the exact same task at the exact same time. The software will petition the amount of work that is done on each computer. That makes it distributed so that they don't have to communicate tightly between them in looped up type mode, for example.

The DSPs have conventional real-time OS interrupts and loop timers to detect whether processing is caught in a loop. There are different applications associated with each timer. For example, on a DSP handling task switching, if a task gets stuck and doesn't switch off properly, it can generate a time-out and interrupt to indicate the presence of an error in the system, communication passes between different processors and is used to signal an event. The events are all generic in the sense that they interrupt the processors and timers that time out. The tightly or more closely coupled processors can have a higher bandwidth and communication to the processors in terms of how the task is distributed. They can be set up so that they communicate more often and can be reallocated if they need to communicate more often. Since they're loosely coupled, they become more independent. They can operate separately and still communicate as much information.

Other features of the invention may be apparent to those skilled in the art from the detailed description of the example embodiments and claims when read in connection with the accompanying drawings. While the foregoing and following written and illustrated disclosure focuses on disclosing example embodiments of the invention, it should be understood that the same is by way of illustration and example only, is not to be taken by way of limitation and may be modified in learned practice of the invention. While the foregoing has described what are considered to be example embodiments of the invention, it is understood that various modifications may be made therein and that the invention may be implemented in various forms and embodiments, and that it may be applied in numerous applications, only some of which have been described herein. It is intended by the following claims to claim all such modifications and variations.

What is claimed is:

1. A communications satellite comprising:
    an up-link sub-system having a downconverter receiving a wideband signal transmission containing information organized into data packets and a demodulator and decoder demodulating the wideband signal transmission and decoding the information to obtain the data packets;
    a processor subsystem having a high speed switch receiving a plurality of data packets from the up-link subsystem, switching the data packets, and providing the data packets at output ports thereof, the processor subsystem comprising a plurality of coupled independent processors;
    software and firmware layered and distributed over the plurality of independent processors; and
    a down-link subsystem receiving the data packets output by the packet switch of the processor subsystem and modulating the data packets in a down link transmission,
    wherein the plurality of coupled independent processors operate under control of said layered software and firmware.

2. The communications satellite recited in claim 1, wherein said plurality of independent processors comprises both general processors and digital signal processors.

3. The communications satellite recited in claim 2, wherein a resource controller provides switch management for said high speed packet switch and controls said plurality of independent processors.

4. The communications satellite recited in claim 1, wherein the bottom layer of said layered software and firmware comprises firmware optimized for specific hardware control or data movement.

5. The communications satellite recited in claim 4, wherein the layer immediately above said firmware optimized for specific hardware control or data movement comprises a real-time operating system for general purpose processing.

6. The communications satellite recited in claim 5, wherein the layer immediately above said real-time operating system for general purpose processing comprises software executives optimized for said digital signal processors and embedded I/O control functions.

7. The communications satellite recited in claim 6, wherein the layer immediately above said software executives optimized for said digital signal processors and embedded I/O control functions comprises application software distributed and optimized to each digital signal processor and general processor.

8. The communications satellite recited in claim 7, wherein said application software comprises a fault management program which detects faults in said plurality of independent processors.

9. A high speed packet switch comprising:

a plurality of inbound modules;

a switch fabric receiving data packets from said plurality of inbound modules at a plurality of input ports thereof and switching said data packets to be controllably output from output ports thereof;

a plurality of outbound modules, said plurality of outbound modules receiving said data packets from said output ports of said switch fabric;

software and firmware layered and distributed over a plurality of coupled, independent processors implementing said inbound modules, switch fabric and outbound modules; and a resource controller controlling each of said inbound modules, switch fabric and outbound modules, wherein said inbound modules, switch fabric and outbound modules, and resources controller operate under control of said layered software and firmware.

10. The high speed packet data switch recited in claim 9, wherein said plurality of independent processors comprises both general processors and digital signal processors.

11. The communications satellite recited in claim 10, wherein said resource controller provides switch management for said high speed packet switch and controls said plurality of independent processors.

12. The communications satellite recited in claim 9, wherein the bottom layer of said layered software and firmware comprises firmware optimized for specific hardware control or data movement.

13. The communications satellite recited in claim 12, wherein the layer immediately above said firmware optimized for specific hardware control or data movement comprises a real-time operating system for general purpose processing.

14. The communications satellite recited in claim 13, wherein the layer immediately above said real-time operating system for general purpose processing comprises software executives optimized for said digital signal processors and embedded I/O control functions.

15. The communications satellite recited in claim 14, wherein the layer immediately above said software executives optimized for said digital signal processors and embedded I/O control functions comprises application software distributed and optimized to each digital signal processor and general processor.

16. The communications satellite recited in claim 15, wherein said application software comprises a fault management program which detects faults in said plurality of loosely coupled independent processors.

* * * * *